United States Patent
Beier

(10) Patent No.: US 6,468,324 B1
(45) Date of Patent: Oct. 22, 2002

(54) MOUNTING SYSTEM FOR FILTRATION MEDIA

(75) Inventor: Scott B. Beier, Omaha, NE (US)

(73) Assignee: Products Unlimited, Inc., Omaha, NE (US)

( * ) Notice: Subject to any disclaimer, the term of this patent is extended or adjusted under 35 U.S.C. 154(b) by 0 days.

(21) Appl. No.: 09/824,930

(22) Filed: Apr. 3, 2001

(51) Int. Cl.[7] .............................................. B01D 27/08
(52) U.S. Cl. ........................... 55/492; 55/496; 55/511; 55/521; 55/DIG. 31
(58) Field of Search ........................ 55/492, 497, 502, 55/510, 511, 521, DIG. 31, 493, 496

(56) References Cited

U.S. PATENT DOCUMENTS

| | | | | |
|---|---|---|---|---|
| 3,168,917 A | * | 2/1965 | Bartels | 55/DIG. 31 |
| 5,342,423 A | * | 8/1994 | Taft | 55/DIG. 31 |
| 5,476,526 A | * | 12/1995 | Attermeyer | 55/DIG. 31 |
| 5,609,937 A | * | 3/1997 | Reinstad | 55/DIG. 31 |
| 5,837,022 A | * | 11/1998 | Chapman | 55/DIG. 31 |
| 5,843,198 A | * | 12/1998 | Wacker | 55/DIG. 31 |
| 5,849,187 A | * | 12/1998 | Plaisier | 55/DIG. 31 |
| 6,007,596 A | * | 12/1999 | Rosen | 55/DIG. 31 |
| 6,126,707 A | * | 10/2000 | Pitten | 55/DIG. 31 |
| 6,214,076 B1 | | 4/2001 | Beier et al. | |
| 6,319,300 B1 | * | 11/2001 | Chen | 55/DIG. 31 |

* cited by examiner

Primary Examiner—David A. Simmons
Assistant Examiner—Minh-Chau T. Pham
(74) Attorney, Agent, or Firm—Thomte, Mazour & Niebergall; Shane M. Niebergall

(57) ABSTRACT

A mounting system for filtration media including an elongated channel member which supports at least one end of the filtration media. The channel member includes first, second, third, and fourth wall members. One end of the first wall member is preferably bent inwardly and has a plurality of engagement points formed therein which are created by forming cut-outs in the first wall member. Preferably, the fourth wall member extends at an acute angle from the third member with the first and fourth wall members defining an opening therebetween into which the filtration media is inserted for support.

8 Claims, 7 Drawing Sheets

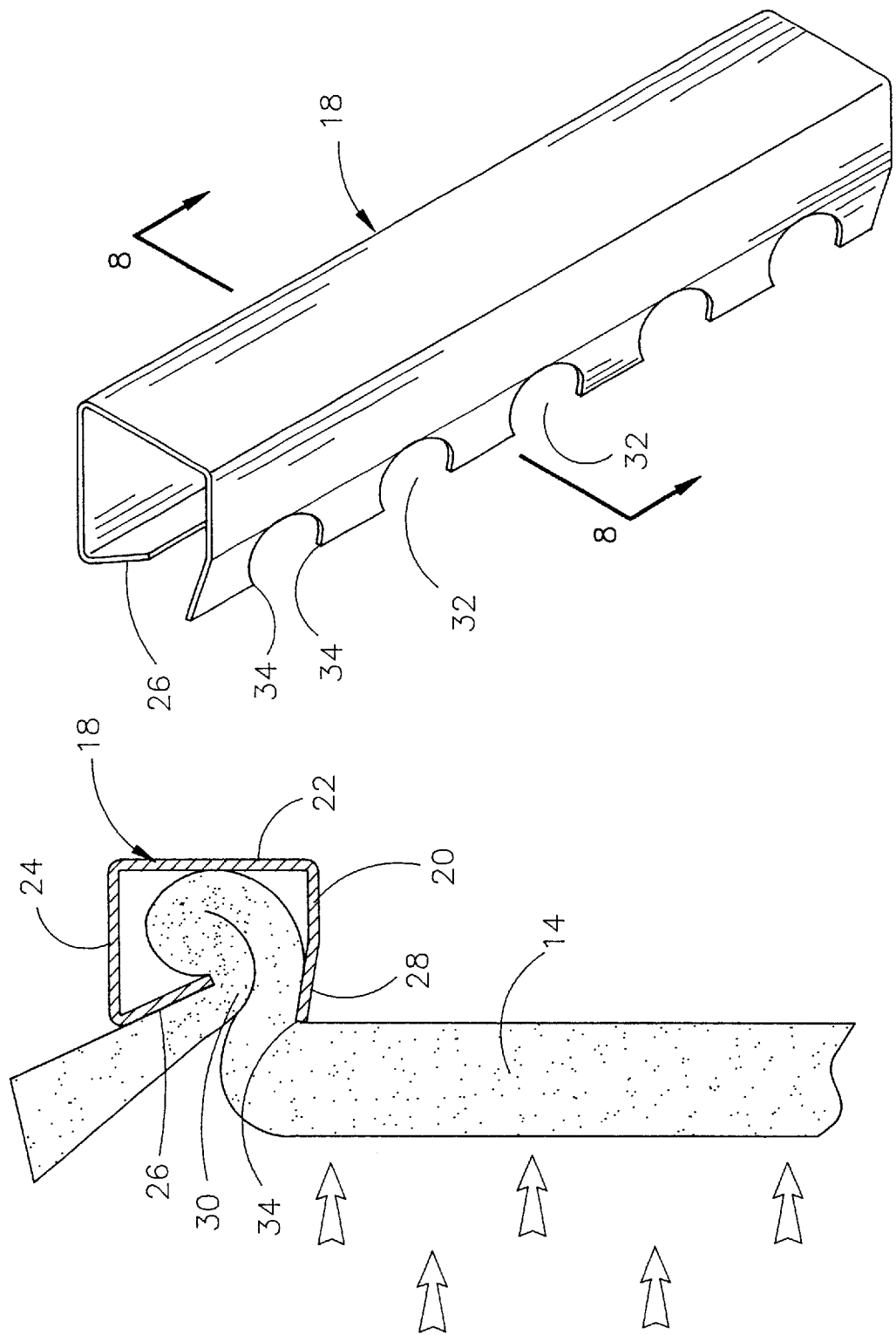

MOUNTING SYSTEM FOR FILTRATION MEDIA

BACKGROUND OF THE INVENTION

1. Field of the Invention

This invention relates to a mounting system for filtration media and more particularly to a mounting system for filtration media which is being used to remove solid or liquid particulate from fluid streams.

2. Description of the Related Art

Filtration systems are utilized in industrial spray painting booths to collect paint droplets from the exhaust airstream. Such collection systems are also utilized in industrial settings to capture the by-products of manufacturing processes which are entrained in airstreams. Obviously, the removal of such particulates in all of these settings is desirable for reasons of health, comfort, and aesthetic appeal. Generally speaking, the filtration media or fluid filter is placed in the fluid stream to remove the particulate from the fluid stream. In many installations, a layer of filtration media is placed in the fluid stream at right angles thereto. The prior art mounting systems for the filtration media is not believed to be convenient to use, nor do the mounting systems for filtration media in the prior art provide a means whereby the filtration media may be easily positioned in the fluid stream and easily removed therefrom. In some of the prior art devices, the filtration media is permanently affixed to a frame which extends therearound. When the filtration media is replaced, the frame is also sometimes discarded.

SUMMARY OF THE INVENTION

A mounting system for filtration media is disclosed for supporting at least one end of a filtration media. The mounting system comprises: an elongated channel member including a first wall member having first and second ends; a second wall member having first and second ends; said first end of said second wall member being positioned adjacent said second end of said first wall member; said second wall member extending at an angle from said first wall member; a third wall member having first and second ends; said first end of the third wall member being positioned adjacent said second end of said second wall member; said third wall member extending at an angle from said second wall member so as to be generally parallel to said first wall member; a fourth wall member having first and second ends; said first end of said fourth wall member being positioned adjacent said second end of said third wall member; said fourth wall member extending at an angle from said third wall member toward said first wall member; said second end of said fourth wall member being spaced from said first wall member to provide an opening therebetween into which the said one end of the filtration media may be inserted. The elongated channel member may be secured to the top edge of the filtration media in one embodiment of the invention or may extend completely around the periphery of the filtration media in another embodiment of the invention. The first wall member has a plurality of spaced-apart filtration media engagement points formed therein in the first end thereof. The engagement points are created by providing cut-outs or voids in the first end of the first wall member. In the preferred embodiment, the cut-outs are semi-circular in shape. In the preferred embodiment, the first wall member has a angular portion at its said first end which is bent towards the fourth wall member. In the preferred embodiment, the fourth wall member extends at an acute angle from the third wall member.

It is therefore a principal object of the invention to provide a mounting system for filtration media.

A further object of the invention is to provide a mounting system for filtration media wherein the filtration media is easily inserted into the mounting system and is easily removed therefrom.

Still another object of the invention is to provide a mounting system for filtration media comprising an elongated channel member which is at least provided at the upper end of the filtration media for supporting the same and wherein the elongated channel member has a plurality of filtration media engagements points formed therein which engage the filtration media to positively secure the filtration media to the channel member.

These and other objects will be apparent to those skilled in the art.

BRIEF DESCRIPTION OF THE DRAWINGS

FIG. 7 is a partial perspective view of the channel member utilized in the mounting system of this invention;

FIG. 8 is a sectional view illustrating the manner in which the filtration media is installed into the channel member of FIG. 7;

DESCRIPTION OF THE PREFERRED EMBODIMENT

Figure 1:
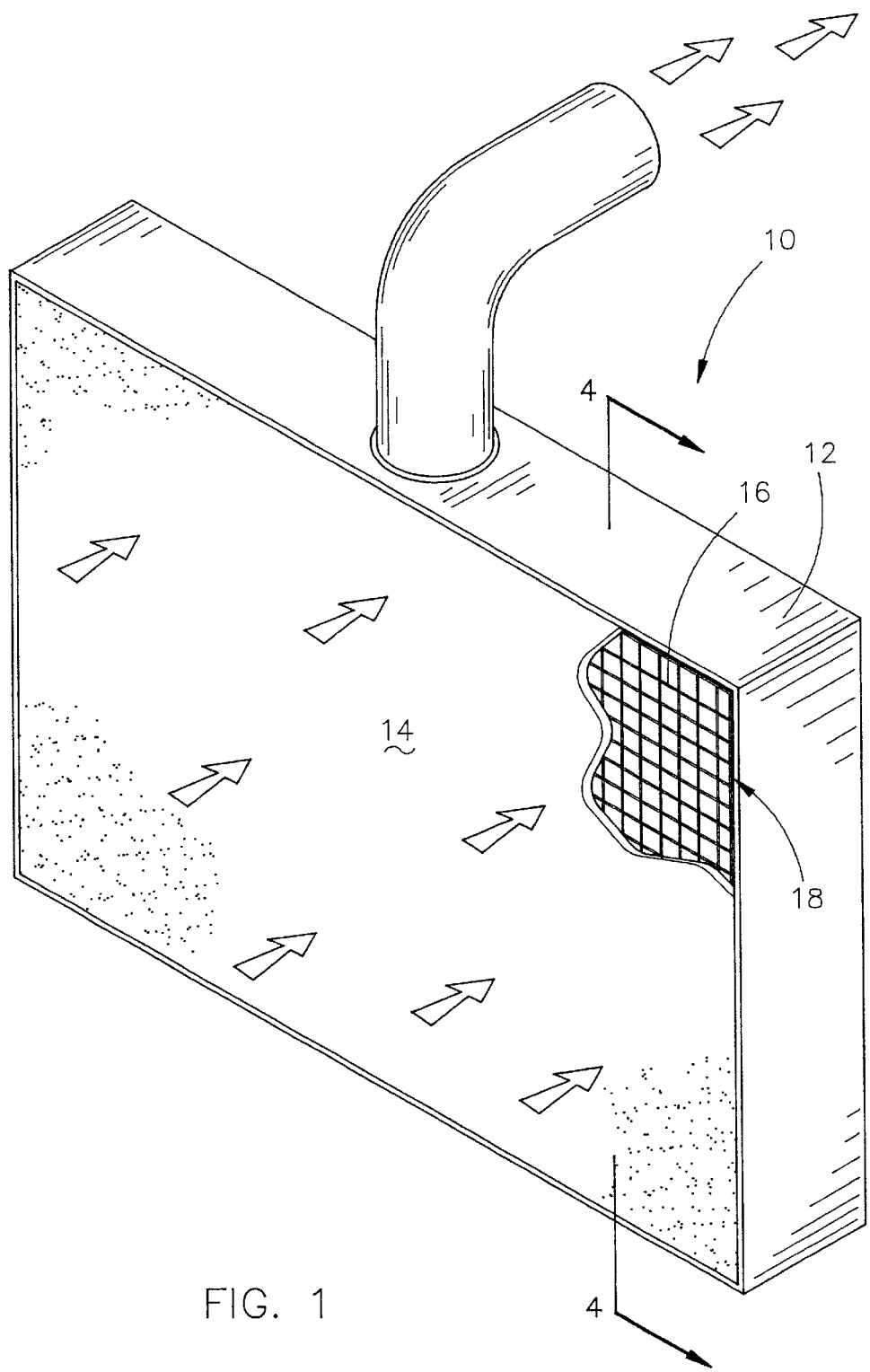
FIG. 1 is a perspective view of the mounting system of this invention wherein only a single filtration media is utilized.

In FIG. 1, the numeral 10 refers to a filtering system such as used in a spray booth or the like with the arrows indicating the flow of air therethrough. Generally speaking, system 10 includes a housing 12 having the filtration media 14 positioned on the inlet side thereof to filter particulate materials from the airstream or air flow. In some cases, a reinforcing member 16 in the form of a mesh-like material may be positioned downstream of the filtration media 14, if so desired or required. An elongated channel member 18 is provided for supporting the filtration media 14 therein and extends around the periphery of the filtration media 14. In some cases, it may be only necessary or desirable to support the filtration media 14 at the upper end thereof and in that situation, the channel member 18 would only extend across the top of the housing 12. In other situations, the channel member 18 will extend completely around the filtration media 14.

Figure 2:
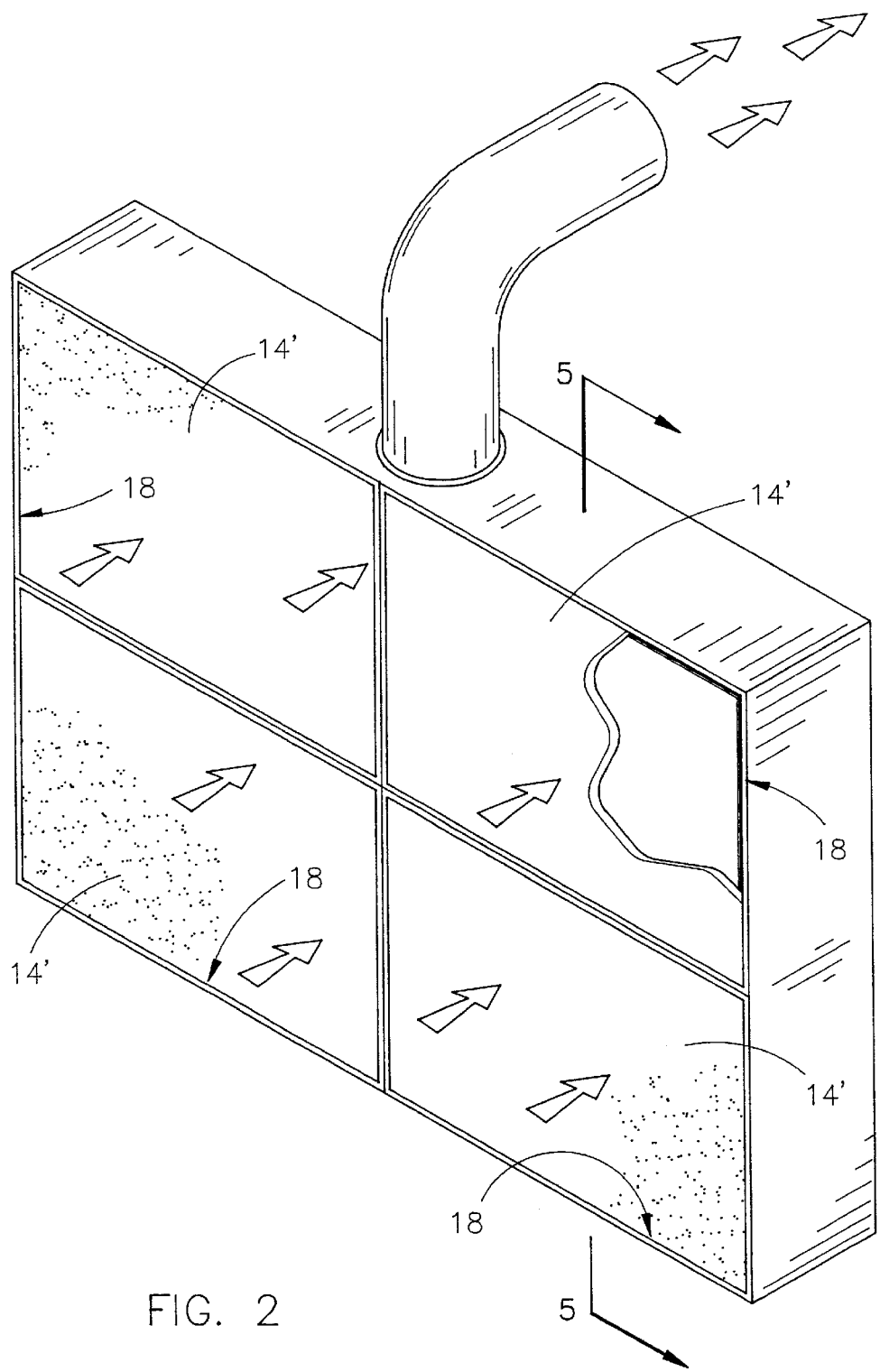
FIG. 2 is view similar to FIG. 1 except that a plurality of filtration media units are utilized.
Figure 3:
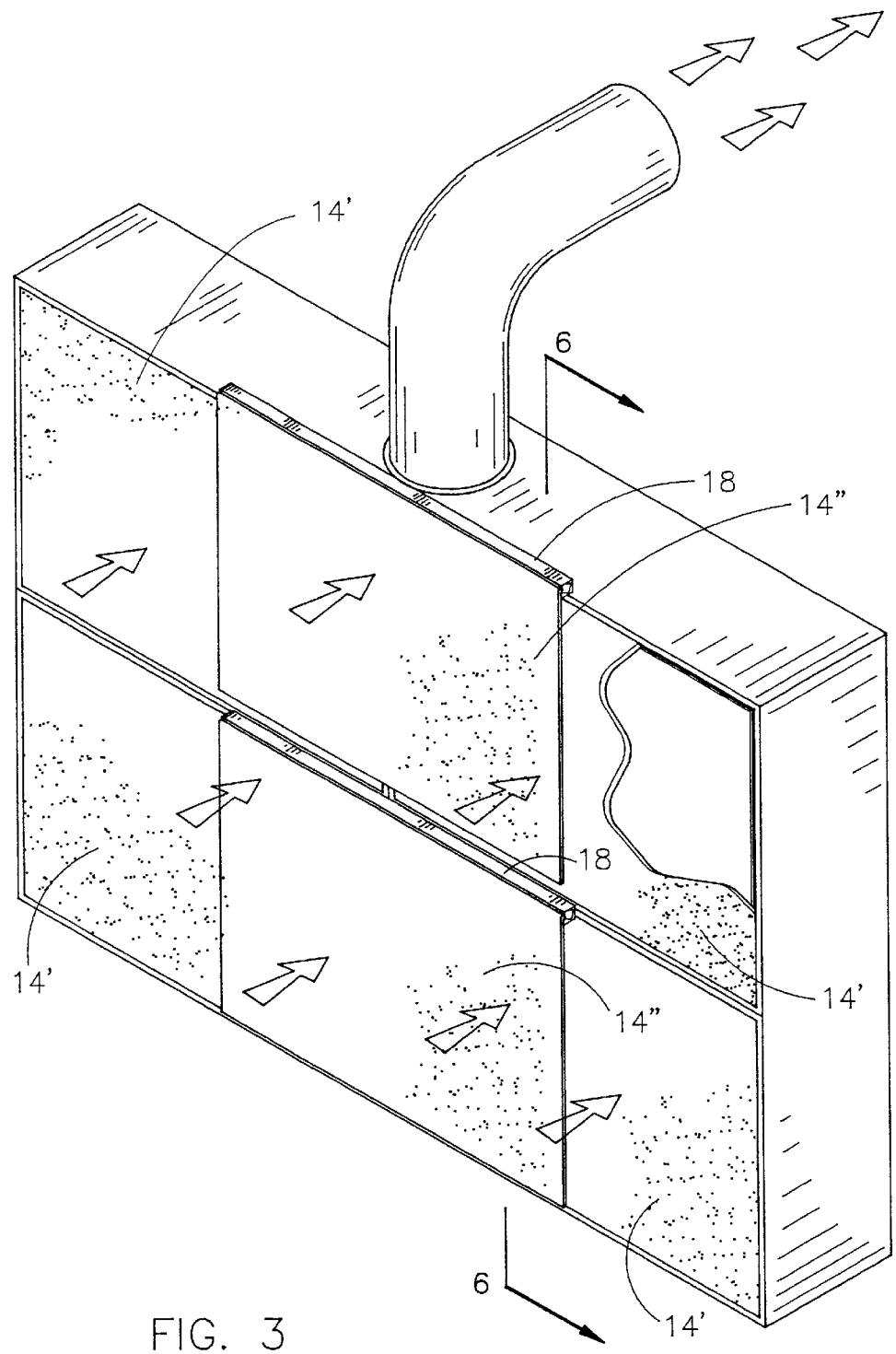
FIG. 3 is a perspective view illustrating yet another manner in which the mounting system of this invention may be utilized.
Figure 4:
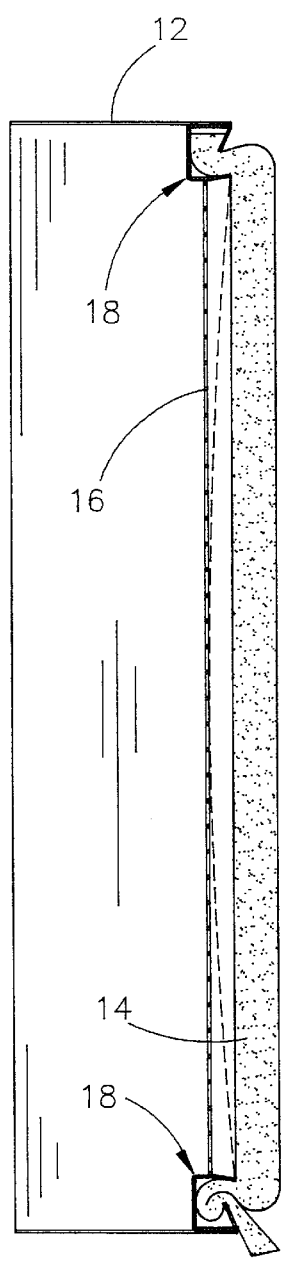
FIG. 4 is a sectional view as seen along lines 4—4 of FIG. 1.
Figure 5:
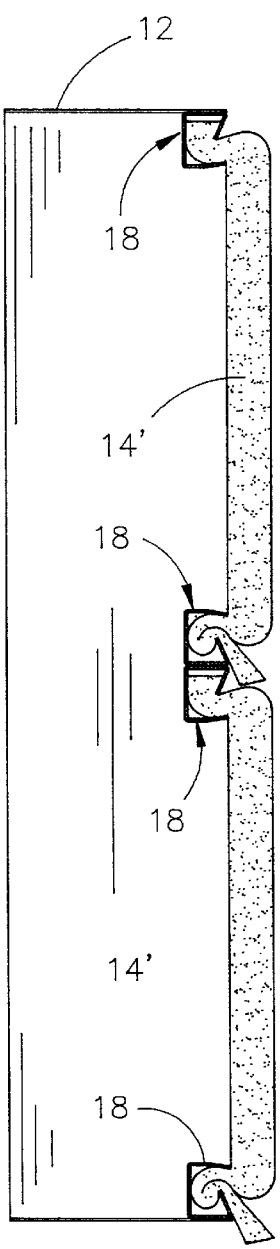
FIG. 5 is a sectional view as seen along lines 5—5 of FIG. 2.
Figure 6:
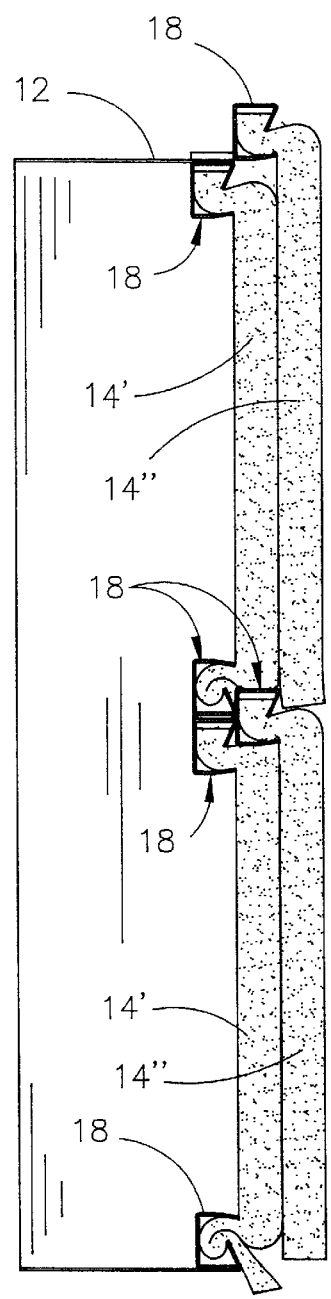
FIG. 6 is a sectional view as seen along lines 6—6 of FIG. 3.

In FIG. 2, rather than utilizing a single filtration media 14, a plurality of the filtration medias are utilized with the same being designated by the reference numeral 14'. Each of the filtration medias 14' has an elongated channel member 18 extending around the periphery thereof. FIG. 3 illustrates an embodiment wherein a plurality of the filtration media units 14' are utilized and wherein sacrifice media units are utilized which are generally designated by the reference numeral 14". Each of the sacrifice units 14" have a channel member 18 at the upper end thereof for supporting the filtration media therein.

Channel member 18 includes a first wall member 20, second wall member 22, third wall member 24, and fourth wall member 26. Wall member 20 is preferably provided with an end portion 28 which is bent inwardly, as seen in FIG. 8. Wall member 26 preferably extends from wall member 24 at an acute angle with respect thereto and terminates inwardly of wall member 20 to define a space 30 between wall member 26 and end portion 28 of wall member 20. The free end of wall member 20 is provided with a plurality of voids 32 formed therein which create filtration media engagement points 34. Although it is preferred that the cut-outs or voids 32 are semi-circular in shape, as viewed in FIG. 7, the cut-outs 32 could be V-shaped, box-shaped, or any other shape as long as engagement points 34 are provided.

When it is desired to insert the filtration media 14 in the channel member 18, the media is folded upon itself at least at one thereof, as illustrated in FIG. 8, and is pushed inwardly into or through the opening 30, as seen in FIG. 8. The engagement points 34 engage the filtration media 14 as does the inner end of the wall member 26 so that the filtration media is securely held in the channel member 18.

Figure 9:
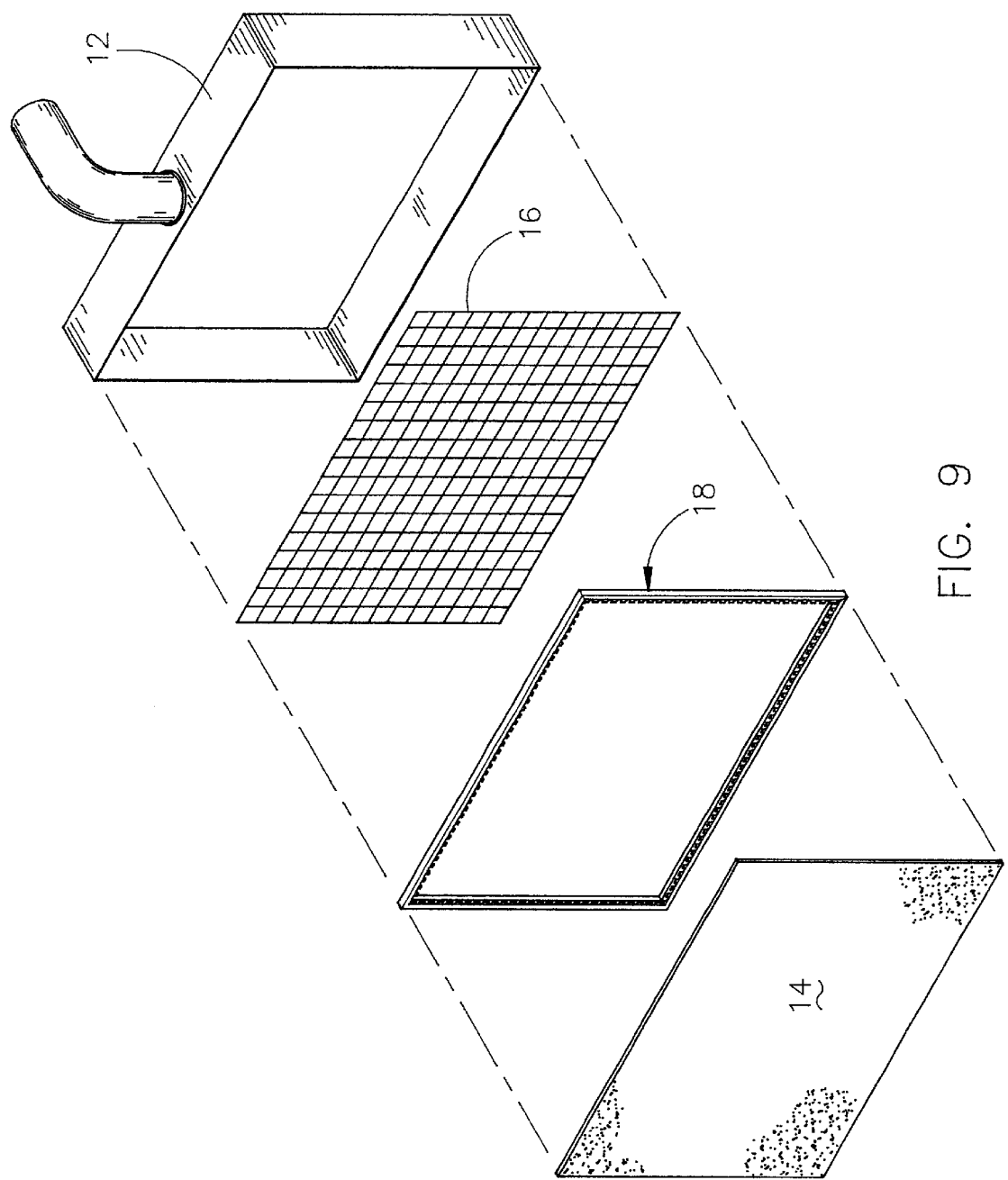
FIG. 9 is an exploded perspective view of the embodiment illustrated in FIG. 1.
Figure 10:
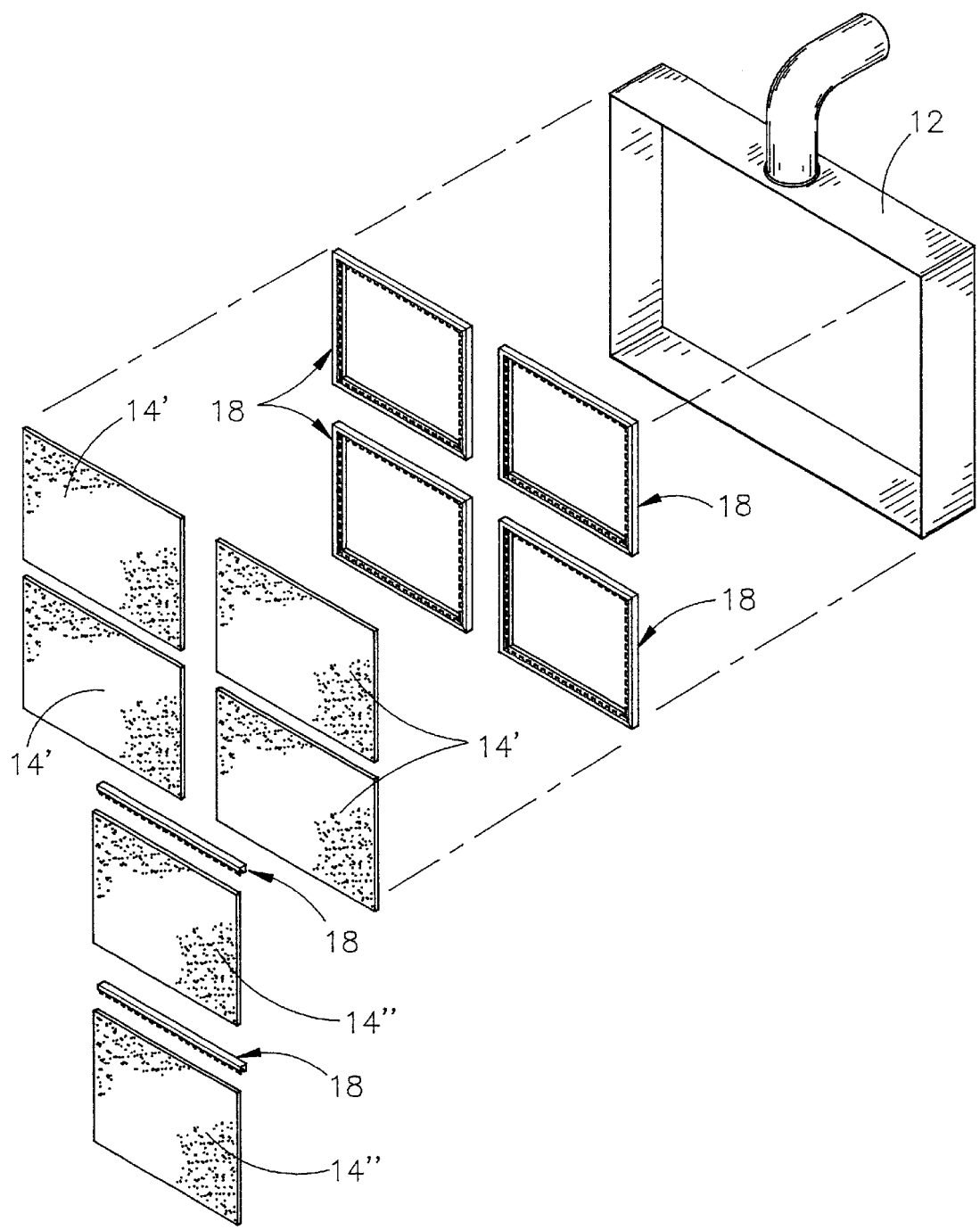
FIG. 10 is an exploded perspective view of the embodiment illustrated in FIG. 3.

When a single channel member 18 is used to support the upper end of a filtration media, it is recommended that the sides of the filtration media 14 extend beyond the sides of the opening in the housing 12 and extend below the lower end of the opening in the housing 12. Although supporting the filtration media 14 at its upper end will work satisfactorily in most cases, it will probably be desirable to support all four sides of the filtration media by means of a channel member 18, as illustrated in FIGS. 9 and 10. The channel member 18 may be made of metal or extruded plastic.

In summary, FIG. 1 illustrates an embodiment wherein the channel member 18 extends around the periphery of a single filtration media 14. FIG. 2 illustrates four filtration medias 14' being utilized with the channel member 18 extending completely around each of the filtration media 14. FIG. 3 is similar to FIG. 2 except that at least two of the sacrifice filter units 14" are utilized in addition to the filtration media 14'. FIG. 9 is an exploded view of the embodiment of FIG. 1 while FIG. 10 is an exploded perspective view of the embodiment of FIG. 3.

In all of the embodiments wherein the channel member is utilized, the filtration media is conveniently secured thereto and maintained therein through the cooperation of the components of the channel member 18. The engagement points previously described are extremely important in that the engagement points tend to engage the filtration media to prevent the filtration media from inadvertently separating from the channel member 18 as the filtration media becomes laden with particulate material. When the filtration media becomes ineffective due to the collection of particulate material therein, the filtration media is easily removed from the channel members or channel member 18 by simply pulling the filtration media from the channel members 18. In the system described herein, it is only necessary to replace the filtration media and it is not necessary to replace the channel members 18.

The channel member could be permanently installed in the filtering apparatus or the channel member could be formed into frames that would have the media first mounted in the channel frame before the frame-media assembly is installed in the filter apparatus.

Thus it can be seen that the invention accomplishes at least all of its stated objectives

I claim:

1. A support for supporting at least one end of a flexible filtration media, comprising:

an elongated channel member including a first wall member having first and second ends; a second wall member having first and second ends, said first end of said second wall member being positioned adjacent said second end of said first wall member, said second wall member extending at an angle from said first wall member; a third wall member having first and second ends, said first end of said third wall member being positioned adjacent said second end of said second wall member, said third wall member extending at an angle from said second wall member so as to be generally parallel to said first wall member; a fourth wall member having first and second ends, said first end of said fourth wall member being positioned adjacent said second end of said third wall member, said fourth wall member extending at an angle from said third wall member towards said first wall member; said second end of said fourth wall member engaging said flexible filtration media and being spaced from said first wall member to provide an opening therebetween into which the filtration media may be inserted and at least partially selectively maintained;

said first wall member having a plurality of spaced-apart filtration media engagement points formed therein in said first end thereof for at least partially selectively maintaining said flexible filtration media.

2. The support of claim 1 wherein said engagement points are created by providing cut-outs in said first end of said first wall member.

3. The support of claim 2 wherein said cut-outs are semi-circular in shape.

4. The support of claim 1 wherein said first wall member has an angular portion at its said first end which is bent towards said fourth wall member.

5. The support of claim 1 wherein said fourth wall member extends at an acute angle from said third wall member.

6. The support of claim 5 wherein said first wall member has an angular portion at its said first end which is bent towards said fourth wall member.

7. The support of claim 6 wherein said engagement points are created by providing cut-outs in said first end of said first wall member.

8. The support of claim 7 wherein said cut-outs are semi-circular in shape.

* * * * *